US007491122B2

(12) United States Patent
Ryan

(10) Patent No.: US 7,491,122 B2
(45) Date of Patent: Feb. 17, 2009

(54) GAMING MACHINE HAVING TARGETED RUN-TIME SOFTWARE AUTHENTICATION

(75) Inventor: Chad A. Ryan, Lisle, IL (US)

(73) Assignee: WMS Gaming Inc., Waukegan, IL (US)

( * ) Notice: Subject to any disclaimer, the term of this patent is extended or adjusted under 35 U.S.C. 154(b) by 889 days.

(21) Appl. No.: 10/616,459

(22) Filed: Jul. 9, 2003

(65) Prior Publication Data

US 2005/0009599 A1    Jan. 13, 2005

(51) Int. Cl.
*A63F 9/24*    (2006.01)

(52) U.S. Cl. .......................................................... 463/29

(58) Field of Classification Search ................... 463/29, 463/20, 42
See application file for complete search history.

(56) References Cited

U.S. PATENT DOCUMENTS

| | | | | |
|---|---|---|---|---|
| 4,072,930 | A | 2/1978 | Lucero et al. ................ | 340/152 |
| 4,405,829 | A | 9/1983 | Rivest et al. ................ | 178/22.1 |
| 4,607,844 | A | 8/1986 | Fullerton ..................... | 273/143 |
| 4,727,544 | A | 2/1988 | Brunner et al. .............. | 371/21 |
| 5,155,768 | A | 10/1992 | Matsuhara ................... | 380/23 |
| 5,231,668 | A | 7/1993 | Kravitz ........................ | 380/28 |
| 5,326,104 | A | 7/1994 | Pease et al. .................. | 273/138 |
| 5,643,086 | A | 7/1997 | Alcorn et al. ................ | 463/29 |
| 5,644,704 | A | 7/1997 | Pease et al. ............. | 395/183.18 |
| 5,668,945 | A | 9/1997 | Ohba et al. ................. | 395/186 |
| 5,707,286 | A | 1/1998 | Carlson ........................ | 463/16 |
| 5,737,418 | A | 4/1998 | Saffari et al. ................ | 380/9 |
| 5,768,382 | A | 6/1998 | Schneier et al. ............... | 380/23 |
| 5,871,398 | A | 2/1999 | Schneier et al. ............... | 463/16 |
| 5,970,143 | A | 10/1999 | Schneier et al. ............... | 380/23 |
| 5,971,851 | A | 10/1999 | Pascal et al. ................. | 463/24 |
| 6,071,190 | A | 6/2000 | Weiss et al. .................. | 463/25 |

(Continued)

FOREIGN PATENT DOCUMENTS

GB    2121569 A    12/1983

(Continued)

OTHER PUBLICATIONS

Digital Signature Standard (DSS), FIPS PUB 186-2, U.S. Department of Commerce/National Institute of Standards and Technology, 72 pages (Jan. 27, 2000).

(Continued)

*Primary Examiner*—Robert E. Pezzuto
*Assistant Examiner*—Omkar Deodhar
(74) *Attorney, Agent, or Firm*—Nixon Peabody LLP

(57) ABSTRACT

A gaming machine that authenticates its gaming software substantially continuously and repetitiously while the gaming machine is powered on. A processor, while running the gaming machine's gaming program, determines whether the data in each of a plurality of memories is authentic. The processor may read multiple memories in a parallel fashion while making memory contents authenticity determinations. The processor may also read multiple memories in a serial fashion while making memory contents authenticity determinations. The processor may also read same memories in a parallel fashion and read other memories in a serial fashion while determining the authenticity of each memory's contents. Furthermore, the contents of a memory may be analyzed to decipher between executable data and graphics data such that the executable data's authenticity is determined more often than the graphics data's authenticity.

28 Claims, 3 Drawing Sheets

U.S. PATENT DOCUMENTS

| | | | |
|---|---|---|---|
| 6,099,408 A | 8/2000 | Schneier et al. | 463/29 |
| 6,106,396 A | 8/2000 | Alcorn et al. | 463/29 |
| 6,149,522 A | 11/2000 | Alcorn et al. | 463/29 |
| 6,203,427 B1 | 3/2001 | Walker et al. | 463/16 |
| 6,264,557 B1 | 7/2001 | Schneier et al. | 463/29 |
| 6,364,769 B1 | 4/2002 | Weiss et al. | 463/29 |
| 6,402,614 B1 | 6/2002 | Schneier et al. | 463/17 |
| 6,409,602 B1 | 6/2002 | Wiltshire et al. | 463/42 |
| 6,450,885 B2 | 9/2002 | Schneier et al. | 463/29 |
| 6,487,301 B1 * | 11/2002 | Zhao | 382/100 |
| 6,488,581 B1 | 12/2002 | Stockdale | 463/29 |
| 6,527,638 B1 | 3/2003 | Walker et al. | 463/25 |
| 6,565,443 B1 | 5/2003 | Johnson et al. | 463/43 |
| 6,595,856 B1 * | 7/2003 | Ginsburg et al. | 463/29 |
| 6,607,439 B2 | 8/2003 | Schneier et al. | 463/17 |
| 6,620,047 B1 | 9/2003 | Alcorn et al. | 463/37 |
| 6,629,184 B1 | 9/2003 | Berg et al. | 710/306 |
| 6,645,077 B2 | 11/2003 | Rowe | 463/42 |
| 6,675,152 B1 | 1/2004 | Prasad et al. | 705/64 |
| 6,685,567 B2 | 2/2004 | Cockerille et al. | 463/43 |
| 6,722,986 B1 | 4/2004 | Lyons et al. | 463/29 |
| 6,823,419 B2 | 11/2004 | Berg et al. | 710/306 |
| 6,875,109 B2 | 4/2005 | Stockdale | 463/29 |
| 6,918,831 B2 | 7/2005 | Nguyen et al. | 463/20 |
| 6,926,605 B2 | 8/2005 | Nguyen et al. | 463/20 |
| 6,935,952 B2 | 8/2005 | Walker et al. | 463/25 |
| 6,942,570 B2 | 9/2005 | Schneier et al. | 463/17 |
| 6,962,530 B2 | 11/2005 | Jackson | 463/29 |
| 6,964,611 B2 | 11/2005 | Packes, Jr. et al. | 463/40 |
| 7,008,318 B2 | 3/2006 | Schneier et al. | 463/17 |
| 7,043,641 B1 | 5/2006 | Martinek et al. | 713/187 |
| 7,062,470 B2 | 6/2006 | Prasad et al. | 705/64 |
| 7,063,615 B2 | 6/2006 | Alcorn et al. | 463/1 |
| RE39,368 E | 10/2006 | Alcorn et al. | 463/29 |
| RE39,369 E | 10/2006 | Alcorn et al. | 463/29 |
| RE39,370 E | 10/2006 | Alcorn et al. | 463/29 |
| 7,116,782 B2 | 10/2006 | Jackson et al. | 380/251 |
| 7,125,017 B2 | 10/2006 | LaPorte et al. | 273/269 |
| RE39,400 E | 11/2006 | Alcorn et al. | 463/25 |
| RE39,401 E | 11/2006 | Alcorn et al. | 463/29 |
| 7,137,893 B2 | 11/2006 | Canterbury | 463/43 |
| 7,162,036 B2 | 1/2007 | Rowe | 380/251 |
| 7,177,428 B2 | 2/2007 | Gordon et al. | 380/251 |
| 7,179,170 B2 | 2/2007 | Martinek et al. | 463/29 |
| 2003/0008704 A1 | 1/2003 | Gauselmann | 463/20 |
| 2003/0028779 A1 | 2/2003 | Rowe | 713/180 |
| 2003/0188231 A1 * | 10/2003 | Cronce | 714/52 |
| 2003/0195033 A1 | 10/2003 | Gazdic et al. | 463/20 |
| 2004/0002381 A1 | 1/2004 | Alcorn et al. | 463/37 |
| 2004/0038740 A1 | 2/2004 | Muir | 463/40 |
| 2004/0043820 A1 | 3/2004 | Schlottmann | 463/43 |
| 2004/0243848 A1 | 12/2004 | Blackburn et al. | 713/201 |
| 2004/0248646 A1 | 12/2004 | Canterbury | 463/29 |
| 2004/0259633 A1 | 12/2004 | Gentles et al. | 463/29 |
| 2004/0259643 A1 | 12/2004 | Gentles | 463/43 |
| 2005/0009599 A1 | 1/2005 | Ryan | 463/29 |
| 2005/0020356 A1 | 1/2005 | Cannon | 463/29 |
| 2005/0143171 A1 | 6/2005 | Loose | 463/29 |
| 2006/0035703 A1 | 2/2006 | Nguyen et al. | 463/22 |
| 2006/0035708 A1 | 2/2006 | Nguyen et al. | 463/29 |
| 2006/0240888 A1 | 10/2006 | Tanimura | 463/20 |
| 2006/0247004 A1 | 11/2006 | Tanimura | 463/20 |
| 2006/0247005 A1 | 11/2006 | Tanimura | 463/20 |
| 2006/0247020 A1 | 11/2006 | Fujimori | 463/22 |
| 2007/0021194 A1 | 1/2007 | Aida | 463/29 |
| 2007/0021195 A1 | 1/2007 | Campbell et al. | 463/29 |
| 2007/0026942 A1 | 2/2007 | Kinsley et al. | 463/29 |

FOREIGN PATENT DOCUMENTS

| | | |
|---|---|---|
| JP | 8-141196 | 6/1996 |
| JP | 10-192533 | 7/1998 |
| WO | WO 97/08870 A2 | 3/1997 |
| WO | WO 97/08870 A3 | 3/1997 |
| WO | WO99/65579 | 12/1999 |
| WO | WO 99/66413 A1 | 12/1999 |
| WO | WO00/33196 | 6/2000 |
| WO | WO 01/24012 A1 | 4/2001 |
| WO | WO01/67218 A1 | 9/2001 |
| WO | WO 02/15998 A2 | 2/2002 |
| WO | WO 02/15998 A3 | 2/2002 |
| WO | WO 02/101537 A1 | 12/2002 |
| WO | WO 03/045519 A1 | 6/2003 |
| WO | WO2005/029272 | 3/2005 |

OTHER PUBLICATIONS

Schneier B: "Applied Cryptography Protocols, Algorithms, and Source Code in C"; Jan. 1, 1996, John Wiley & Sons, New York, US, XP002298839 ISBN: 0-471-12845-7—p. 431.

"JFFS—Journaling Flash File System" Jan. 15, 2003, XP002298844; URL:http://web.archive.org/web/20030115142 058/ http://developer.axis.com/software/jffs/doc/jffs.shtml—retrieved on Oct. 1, 2004—p. 1-p. 6.

"The Silicon Gaming Odyssey Slot Machine"; By Adam Levinthal and Michael Barnett; pp. 296-301; Proceedings of COMPCON 97.

* cited by examiner

GAMING MACHINE HAVING TARGETED RUN-TIME SOFTWARE AUTHENTICATION

REFERENCE TO RELATED APPLICATIONS

This application is related to U.S. patent application Ser. No. 10/119,663 filed on Apr. 10, 2002, entitled "Gaming Software Authentication", and incorporated herein by reference in its entirety.

FIELD OF THE INVENTION

The present invention relates generally to gaming machines, and more particularly, to software authentication of programs running in a gaming machine.

BACKGROUND OF THE INVENTION

As a regulatory requirement in virtually all jurisdictions that allow gaming, it is necessary to have a technique to authenticate that the software installed in a gaming machine is tested and approved. In the past, gaming manufacturers have generally used EPROM-based hardware platforms to store program code. As a result, a number of software authentication techniques have been accepted as standards throughout the gaming industry. Depending upon the preferences of the local regulatory agency, these techniques generally include either a Kobetron signature or a hash function based on the data stored in the EPROM device.

Authentication of software programs basically occurs using two different methods in the field, again determined by the local regulatory agency. In one method, each EPROM is authenticated by a gaming agent prior to being installed in a gaming machine that is to be brought up for play. The EPROMs may be shipped directly to the gaming agency for authentication prior to the install date of the machine, or may be authenticated on the casino floor as the software is being installed in the machine. In another method, authentication is conducted on a spot-check basis wherein a gaming agent periodically visits a casino and picks machines for the removal of software components for authentication.

Jurisdictional requirements require that storage media containing code or data be authenticated at power-up, continuously or at a periodic rate, or upon occurrence of predetermined events, such as the opening any doors or panels of the gaming device that allows access to internal circuitry. The storage media may be comprised of erasable programmable read-only memory devices (EPROMs), electrically erasable programmable read-only memory devices (EEPROMs), PROMs, CompactFlash storage cards, hard disk drives, CD drives, or substantially any non-volatile memory and in some cases volatile memory (e.g., NVRAM, specialty mask semiconductors, battery backed RAM, SRAM, DRAM, etc.). Storage media comprises a memory device and the data stored thereon. Authentication of storage media is controlled by the gaming device's central processing unit (CPU). However, authentication by the CPU may take more than several minutes due to increasing complexity of the gaming device's software and thus the storage size of the media.

For example, the authenticity of numerous storage devices associated with the CPU may need to be determined every so often while a gaming machine is running. In some cases, gaming authorities require that a gaming program be authenticated about every ten minutes while the gaming machine is running. To determine the authenticity of a memory device's contents the CPU must read the memory device and perform various calculations and comparisons to determine if the memory device's contents are authentic. Reading many memory devices or large memory devices can use significant CPU time and therefore may negatively affect the responsiveness of the gaming program that a user interacts with. What is needed is a technique for authenticating memory devices associated with a gaming machine that does not affect the gaming program that the user interacts with.

SUMMARY OF THE INVENTION

Embodiments of the present invention authenticate a gaming machine program, software, firmware, or data (data) stored in memory devices within the gaming machine while the gaming machine is running and interacting with a user. The authentication process does not slow or interfere with the gaming program that interacts with the user. The authentication processes are ongoing and are substantially continuously repetitive. The authentication processes may substantially repeat every 2 minutes to 24 hours. Furthermore, in order to increase the speed of authenticating some of the data, graphics data may be differentiated from executable data so that the authenticity of the executable data can be determined more often than the graphics data.

It should be understood that for the purposes of this description of exemplary embodiments of the present invention that the gaming machine program may be either compiled or uncompiled. Furthermore the gaming machine program comprises code, files, instructions or programs that are executable in that they direct the gaming machine to do something (hereinafter "executable code"). The gaming machine program further comprises graphics code, files, data, instructions or programs (herein after "graphics data") that have to do with graphics or multimedia applications. Such graphics or multimedia may include, but are not limited to, data or information used to control graphics, animation, or other special effects that move air, move fluids, create smells, create bubbles, create flashing lights, control laser lights, control air pressure, control temperature, control mechanical devices, or control sound devices.

In an embodiment of the present invention a gaming machine comprises a user interface and a central processing unit (CPU) coupled to the user interface. The CPU comprises a processor. A first memory is coupled to the processor. The first memory is adapted to contain executable program code. The executable program code has both executable instructions and graphics data. A second memory is also coupled to the processor. The second memory stores data. The executable instructions found in the first memory include a plurality of instructions configured to cause the processor to determine the authenticity of the executable program code and the data. The processor, with the aid of the executable instructions, determines the authenticity of the executable program and the data on a substantially continuous, repetitious basis. Furthermore, the authenticity determination of the executable program code might be performed substantially in a parallel process with the authenticity determination of the data.

Other executable instructions cause the processor to determine, when reading said executable program code, whether executable code or graphics data are being read. If the processor is reading graphics data, then the plurality of executable code cause said processor to not determine the authenticity of the graphics data unless more than a predetermined number of events have passed since the last time the graphics data was authenticated. The events may be seconds, clock count-ups, countdowns, a number of repetitions through a program loop, etc. If the processor reads executable instructions, then the plurality of instructions cause the processor to determine the authenticity of said executable instructions.

In another embodiment of the present invention, a gaming machine comprises a CPU and a plurality of memory devices. The CPU is adapted to determine the authenticity of data in at least two of the plurality of memory devices in a parallel, repeating manner. The CPU is also adapted to read the data stored in at least one of the plurality of memory devices and determine whether the data is executable data or graphics data. If the data stored in a memory is determined to be graphics data, then the CPU is adapted to determine the authenticity of the graphics data if a predetermined number of events have passed. The events may be clock cycles, seconds, count-ups, count-downs, passes through a program routine or loop, uses by a user, number of games played, etc. If the data stored in a memory is determined to be executable data, then said CPU is adapted to determine the authenticity of said executable data.

In another embodiment of the present invention a method is provided for authenticating various memory devices' data within a gaming machine while the gaming machine is operating. The authentication process of the memory devices' data can be performed in substantially a parallel fashion, such that two or more memory device's data is being authenticated at about the same time. The method of authenticating also comprises reading data from a first memory device and determining or using other techniques to determine whether the data is graphic data or executable code. If the data is determined to be graphic data, then more data is read from the first memory device. If the data is determined to be executable data, then it is determined whether the executable code is authentic after which more data is read from the first memory device.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
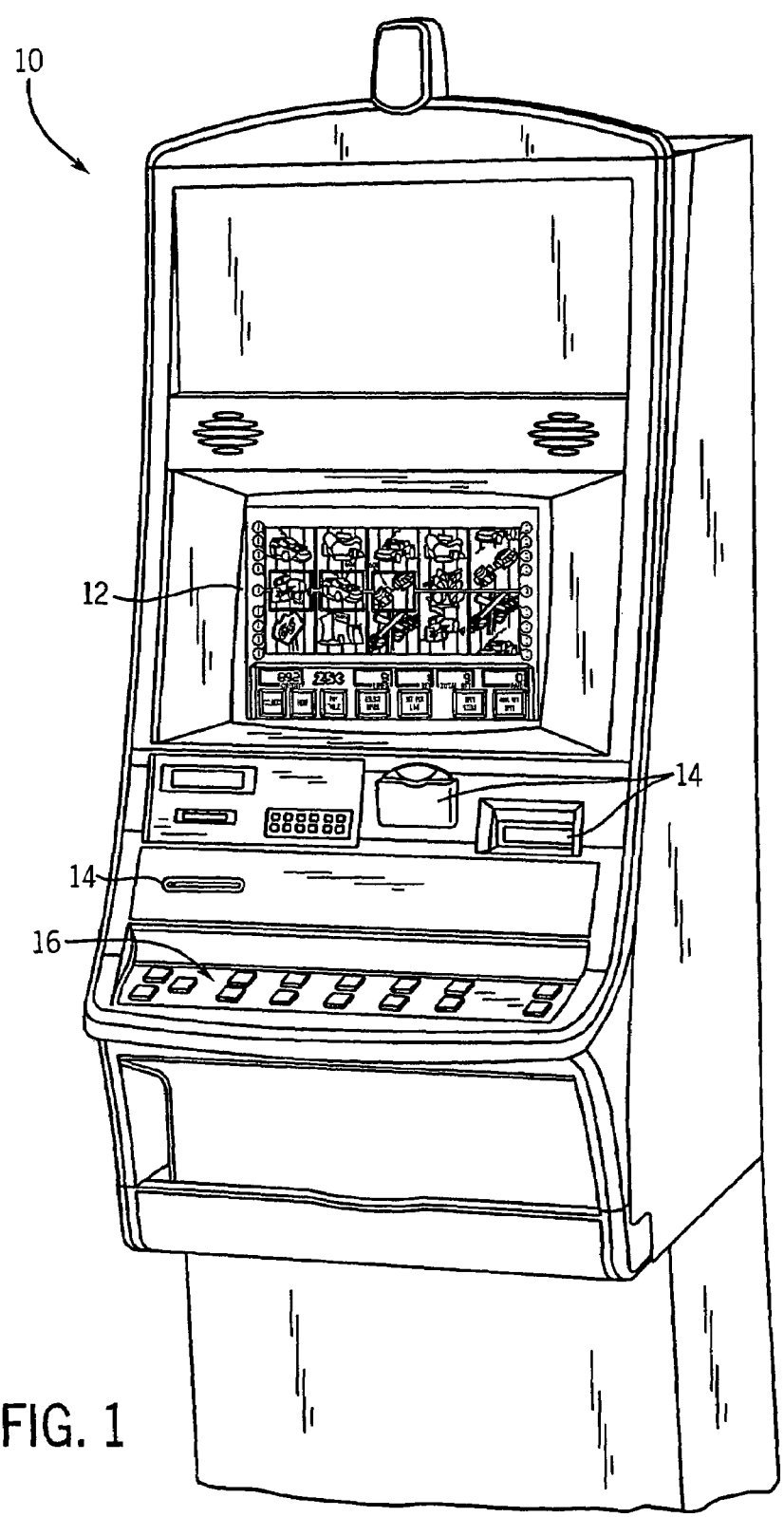
FIG. 1 is an isometric view of a gaming machine operable to conduct a wagering game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of visual display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chips) cards coded with money or designating an account containing money.

The gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table (s), and a "call attendant" button for calling an attendant. Additional game-specific buttons may be provided to facilitate play of the specific game executed on the machine. The touch screen may define touch keys for implementing many of the same functions as the push-buttons. Other possible user interface devices include a keyboard and a pointing device such as a mouse or trackball.

Figure 2:
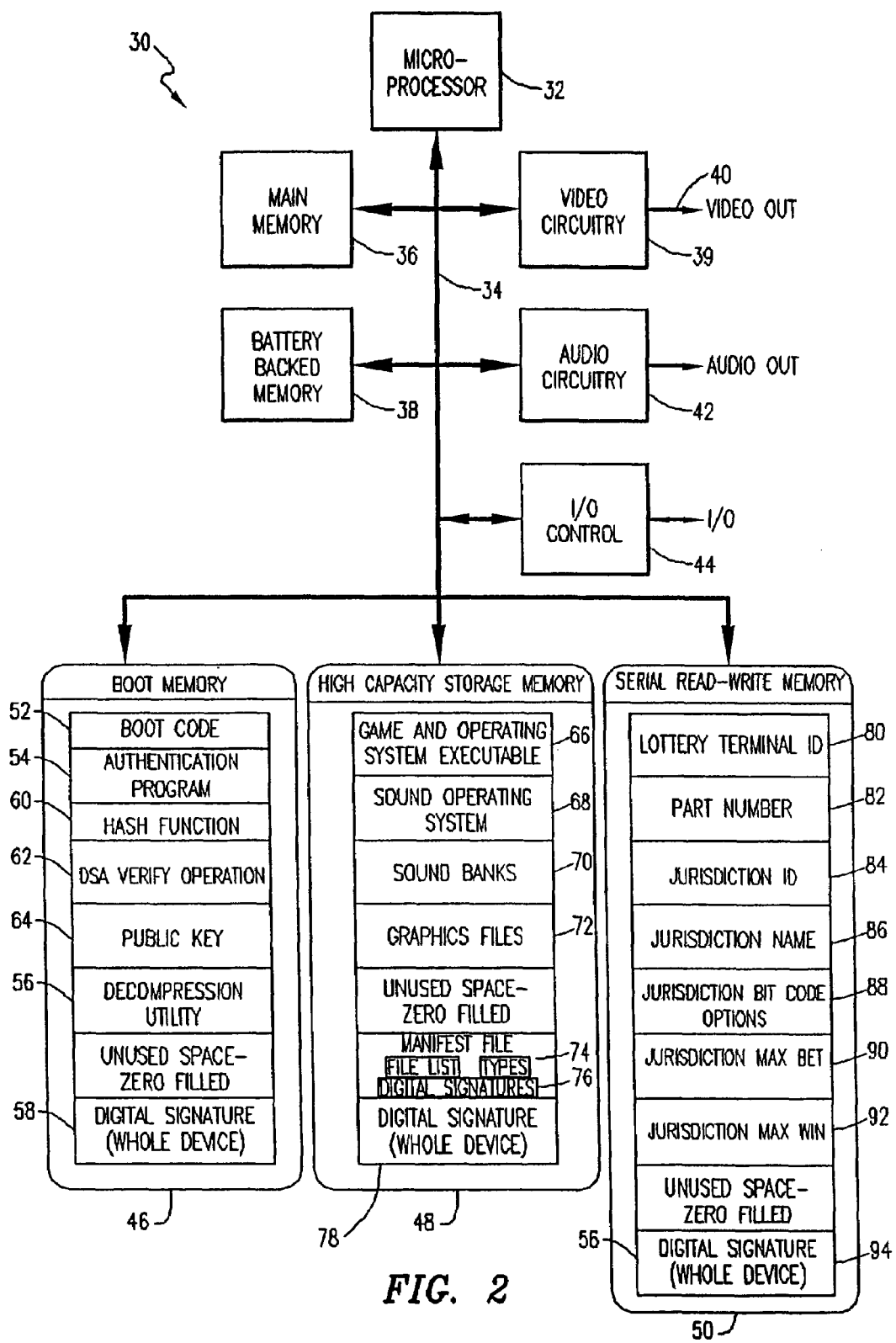
FIG. 2 is an exemplary block diagram of a CPU in a gaming machine according to the present invention.

Referring now to FIG. 2, a central processing unit (CPU) 30 controls operation of the gaming machine 10. In response to receiving a wager and a command to initiate play, the CPU 30 randomly selects a game outcome from a plurality of possible outcomes and causes the display 12, via the video circuitry 39 and video out 40, to depict indicia representative of the selected game outcome. Alternatively, the game outcome may be centrally determined at a remote computer using either a random number generator (RNG) or pooling schema. In the case of slots, for example, mechanical or simulated slot reels are rotated and stopped to place symbols on the reels in visual association with one or more pay lines. If the selected outcome is one of the winning outcomes defined by a pay table, the CPU 30 awards the player with a number of credits associated with the winning outcome.

The CPU 30 includes a microprocessor 32 and various memory devices is (media devices). The microprocessor 32 interfaces with many other components of the gaming machine 10 via an interface bus 34. A main memory 36 stores the compiled gaming machine program for operating the gaming machine 10.

The main memory 36 may be DRAM or SRAM or substantially any other volatile memory device or reprogrammable non-volatile memory device. The battery backed memory 38 stores machine critical data that cannot be lost when power is removed from machine 10. The battery backed memory 38 may be battery backed volatile memory or a reprogrammable or rewritable non-volatile memory device. The video circuitry 39 supplies display information to a video display 12 that may comprise a CRT, LCD, plasma, or other display device. Audio circuitry 42 generates sounds for game play on the gaming machine 10. The I/O control 44 controls input/output interfaces with the user interfaces such as game buttons 16, coin validators 14, touch screen bill validators, multimedia devices, etc.

In an exemplary embodiment, the various memory devices may also include a boot memory 46, a high capacity storage memory 48, and a serial read-write memory 50. The boot memory 46 is preferably a read-only memory such as a one megabit EPROM, EEPROM, PROM or other type or appropriately sized programmable read-only memory. The boot memory 46 may also be substantially any type of non-volatile memory. The high capacity storage memory 48 is preferably a CompactFlash card, but may also be a hard disk drive, CD drive, DVD drive, magnetic RAM, battery backed RAM or other type of non-volatile memory. The serial memory 50 is preferably an EEPROM such as a 512 byte SPI EEPROM, but could be any type of programmable read-only or read/write non-volatile memory. Depending upon the preferences of the local gaming regulatory agency, all three memories may be adapted to be authenticated outside of the CPU as well as when installed in the CPU at power up or prior to being utilized in the gaming machine.

The boot memory 46 stores, at least some of the following, boot code 52, an authentication program 54, a RAM loader, a decompression utility 56, and a digital signature 58. The authentication program includes a hash function 60, a digital signature verification algorithm 62, and a public key 64. The hash function 60 may, for example, be an SHA-1 hash algorithm that reduces a data set to a unique 160 bit message digest. A hash algorithm or function is used to calculate a message digest corresponding to the files in, for example, a memory device. The message digest does not have to be unique, i.e., the function may return the same hash value for two or more items (although this is very unlikely). The non-uniqueness of the hash value for each item in the message digest is acceptable because each hash value is used to evaluate a different file or data set within a memory device. The message digest is a small representation of a large amount of data. A message digest is a relatively unique representation of data, from a cryptographic standpoint, and is an irreversible representation of the data. In other words, one cannot recreate the original data from the message digest.

The digital signature 58 is generated, in effect, from the boot memory's contents as a whole. In an exemplary embodiment, after hashing is performed to produce a message digest, then a digital signature is created to enable the origin and authenticity of the digest to be determined. When there is data that requires a means for determining the origin of the data, one generally uses a digital signature mechanism. There exists a federal standard called FIPS 186-2 that defines a digital signature generation and verification mechanism called the Digital Signature Algorithm (DSA). In an exemplary embodiment a digital signature is created from the message digest. In essence the DSA uses a private key, a public key, and the message digest. A private key and the message digest are used to create an original signature associated with the original message digest. The public key, the original signature, and a calculated message digest are used to check a signature associated with a message digest in order to determine the origin and authenticity of the data set. It is understood that neither the message digest nor the data or files used to create the message digest can be recreated using the DSA. The digital signature 58 is used to sign the message digest of the boot memory contents. Again, the signature may be used to determine the source or manufacturer of the message digest, via a public key, but cannot be used to recreate the message digest or the original data. Furthermore, the DSA is not being used here as an encryption process under FIPS 186-2, but rather a technique for validating the signature associated with the data set, and the public key.

The high capacity storage memory 48 stores game and operating system executable program files 66, sound operating system files 68, sound bank files 70, graphics files 72, a file list of file types 74, and digital signatures 76, 78. The files in the high capacity storage memory 48, taken together, constitute a "gaming program" as that term is used herein, and the various files constitute "data files" as that term is used herein. Thus, the gaming program includes a plurality of data files. For each data file on the high capacity storage memory 48, the manifest file contains a file name, a file type, a load address, and a file digital signature 76. The whole device digital signature 78 is generated from the gaming program as a whole, while each digital signature 76 is generated from the associated data file listed in the manifest file.

The serial read-write memory 50 stores information/data specific to the jurisdiction where the CPU is to be installed. This information may, for example, include a lottery terminal identification (ID) 80, a part number 82, a jurisdiction ID 84, a jurisdiction name 86, jurisdiction bit code options 88, jurisdiction max bet 90, jurisdiction max win 92, and a digital signature 94. The digital signature 94 is generated from the serial memory's contents as a whole.

The boot memory 46, serial read-write memory 50 and high capacity storage memory 48 may each be removable devices and/or contain alterable software. Each of these memory devices may be able to be reprogrammed or be able to receive downloaded updates from an outside source via a programming device, a network such as the Internet, an intranet, an Ethernet, a fibre loop, or other type of networking system. The boot memory 46, serial read-write memory 50, and high capacity memory 48 each may be required to be authenticated by the gaming machine 10 at various points during operation of the gaming machine.

In order to better understand the advantages of an exemplary run-time authentication algorithm, it is important to realize that as gaming machines evolved they began to use alterable media, such as flash memories, EEPROMs, EPROMs, CD drives, disk drives, etc. in their electronics and programming structure to store all or portions of the programs and files. Newer gaming machines are designed to allow the gaming software to be updated, to grow in size, and to grow in complexity. Because of these advances and changes in gaming machine design, electronics, software and memory storage size the time necessary to authenticate the software in the storage media during run-time operations has increased because the methods required to authenticate the software content became more complex. An increase in the time required to authenticate the software during machine run-time operations may affect the responsiveness and speed of the run-time software as well as the smoothness of operation to the extent that it is noticeable to the user. A CPU may become unable to effectively operate the gaming machine main program while multiplexing authentication processes are taking place due to the sheer size of the main program that must be authenticated within a predefined period of time. Thus, it is necessary to provide a technique to authenticate the gaming programs and media within various media devices without slowing or disturbing the operation of the gaming machine.

An exemplary run-time authentication comprises two main cycles of events during the operation of a gaming machine. The first cycle of events checks whether the high capacity storage memory 48 is connected to the bus 34. This check is performed at predetermined intervals that may range from about every 5 ms to about every minute. The first cycle also checks whether the high capacity storage memory's 48 SHA-1 message digest calculation is continuously being recalculated.

The second cycle of events performs a constant or continuous authentication of the boot memory 46, the serial read-write memory 50, the files that are being executed from the main memory 36, and the integrity of the data stored in the battery backed memory 38. Utilizing a SHA-1 hash message digest of a media device's contents the authentication of each media device is performed. The authentication of the media device during a run-time authentication may be limited to the data in the whole media device rather than the individual files stored in the media device. The authentication of a media device may also be performed file by file when the CPU has stored the memory locations and the type of data in the memory locations prior to an authentication process.

During a boot-up process of the CPU 30 the media devices and software thereon are normally authenticated. The boot-up authentication process includes performing a SHA-1 hash over the media software that is loaded into the main memory 36, authenticating the digital signature 58, 78, 94, and storing the calculated hash message digest in battery backed memory. Thus, during run-time authentication there is no requirement to perform signature verification since the files and components were proven to be authentic during the boot process. One main purpose of run-time authentication is so the CPU 30 can check to make sure that the files and data loaded into the main memory 36 during the boot process have not been altered. Another purpose of the run-time authentication is to verify that certain software or hardware components, such as the boot memory 46, the high capacity storage memory 48, or the serial read-write memory 50 have not been changed or undergone a change in any of their software/firmware. In order to check the executable code in main memory 36, the boot memory 46, the high capacity storage memory 48, or the serial read-write memory 50 for authenticity, only a SHA-1 hash, or its equivalent is necessary since all had been verified at boot-up to have come from a trusted source via a digital signature verification process. It is understood that there are various other techniques other than a SHA-1 hash function that could be used to verify the authenticity of the various media devices during run time. Such other techniques may include, but are not limited to, CRC-16, CRC-32, MD5 and checksum techniques.

As an additional run-time authentication and verification check, a digital signature verify operation is performed on the media devices (e.g., main memory 36, boot memory 46, high capacity storage memory 48, and serial read-write memory 50) when the gaming software returns from certain gaming events. These events are mainly security events wherein people have had access to the inside of the gaming machine or the gaming machine has made a large payout. The security events that may require an additional run-time verification and authentication check along with a digital signature verify operation include, but are not limited to:

1. Any "door closure event". On a gaming machine there may be various doors or hatches for providing access to the interior of the gaming machine. Anytime one of the doors or hatches is closed, the gaming program and other various media devices are checked for authenticity because someone may have had access to the interior of the gaming machine.
2. Any return to game play when exiting the "administration screen". Various gaming machines have an administration mode. There may be one or more levels for the administration mode. For example, one mode may include critical configuration settings affecting the payouts made by the gaming device and may require machine doors or hatches to be accessed to gain entry. Another mode may allow an administrator to view and verify meters, event logs, game playtime, machine statistics and other items benign to the functionality of the gaming device without unlocking any machine access doors or hatches.
3. Any return to game play from a "game disable" state. An attendant, a command from a host system, or other internal mechanisms can place the gaming machine in a game disable state in order to reserve the gaming machine for a certain player or for numerous other reasons. Essentially the gaming machine is on, but will not operate until it is taken out of the disabled state.
4. Any cashout handpay state. A cashout handpay is typical when a player would like to cash out of gaming machine and the amount of credit or winnings on the gaming machine is higher than the amount of coins or payout units in the gaming machine's hopper or higher than an operator configured machine payout limit. If this occurs, the gaming machine may go into a cashout handpay state wherein an attendant will have to come to the gaming machine and assist the player so that the player can get manually paid or handpaid. Once the cashout handpay is completed the attendant will use a key, card or other code or device to access the gaming machine and exit from the cashout handpay state.
5. Any Jackpot handpay state. A Jackpot handpay state is similar to the cashout handpay state, except the gaming machine is set to go into a Jackpot handpay state when a jackpot hit by the player is above a predetermined amount such as a monetary amount that must be reported to Internal Revenue Service (IRS). When a jackpot of the predetermined amount or greater is hit then the machine locks up and an attendant is called to hand pay the player and further to have the player fill out the appropriate IRS (W-2G) form(s). The attendant can then use a key, card, pass code, or other appropriate means to reset the gaming machine into a play mode again.

After a successful verification of all files in main memory 36, the battery backed memory 38 is verified using, for example, a CRC check. The battery backed memory 38 can be set to store two copies of critical data—a first copy that is stored as a master copy and a second copy that is stored as an auxiliary copy. The master copyprogram and auxiliary copy of the critical data can also be compared to each other to help ensure the integrity of the critical data being stored in the battery backed memory 38.

Figure 3:
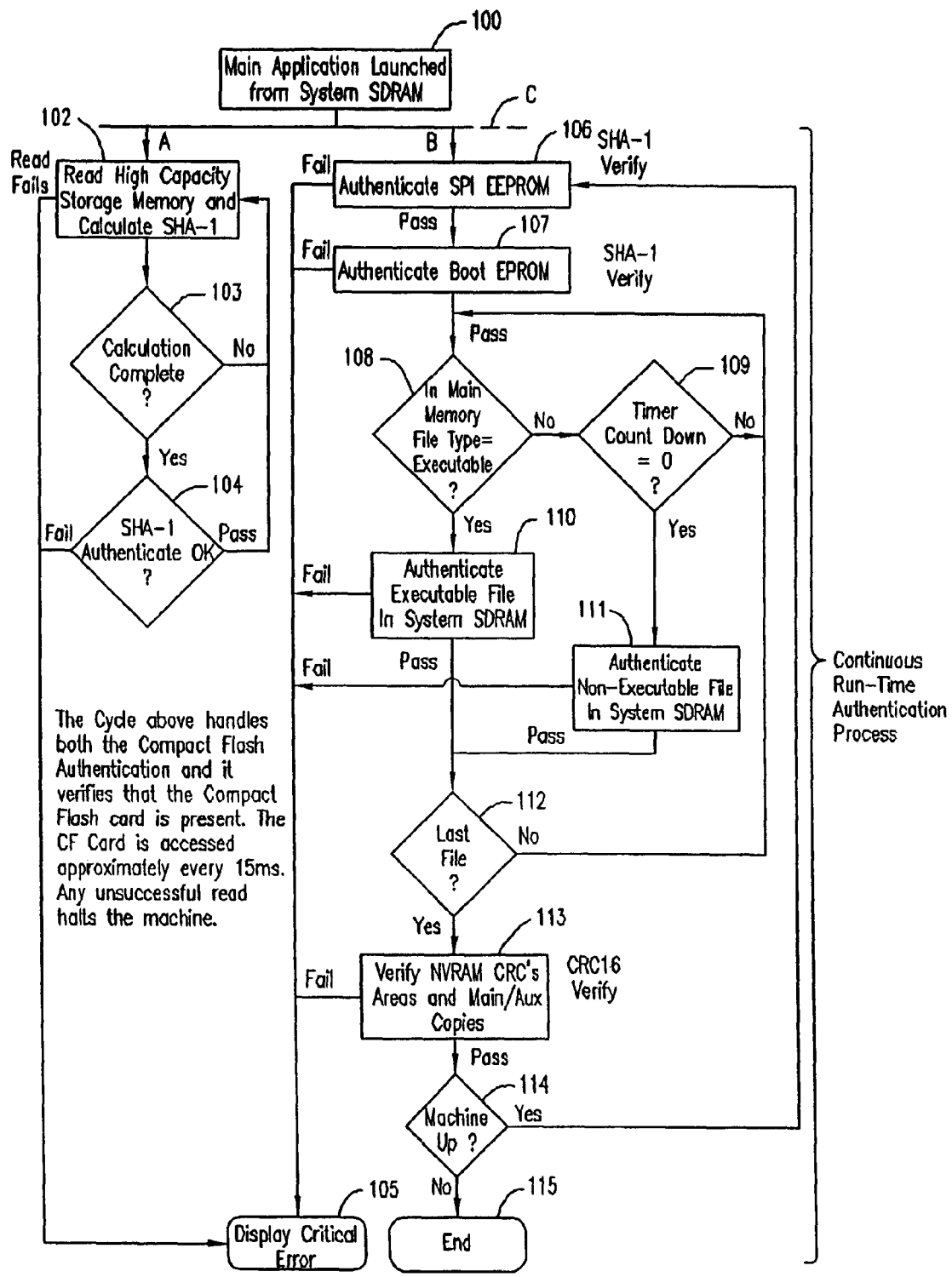
FIG. 3 is a flow chart for an exemplary run-time authentication process for a gaming machine.

FIG. 3 depicts a flow chart of an exemplary authentication process for continuous run-time authentication in accordance with an embodiment of the present invention. After boot-up of the gaming machine, wherein gaming machine program software or firmware was authenticated in at least one of a variety of accepted ways, and while the gaming machine is operational, the CPU 30 will, in conjunction with executing the gaming machine program, continuously authenticate the main memory is 36, battery backed memory 38, boot memory 46, high capacity storage memory 48, the serial read-write memory 50 and any other memories that may require authentication. The CPU can be set to authenticate substantially any media device in the gaming machine or closely associated with the gaming machine through a network. The main application is launched at step 100 from the main memory 36. The gaming machine is operational and the authentication of predetermined media devices begins. From step 100, two authentication functionalities operate substantially in parallel as depicted by path A and path B. Path A authenticates the high capacity storage memory 48, and path B authenticates, in a serial fashion, the main memory 36, the battery backed memory 38, boot memory 46, and the serial read-write memory 50. The dotted line for path C indicates that other authentication processes may also take place in parallel with path A and B.

Discussing path A first, a predetermined amount of data is read from the high capacity storage memory 48 at step 102. Path A is separated from path B because the high capacity storage memory 48 may include a much larger amount of data then that which is found on path B. By separating the paths, all components on path B can be authenticated one or more times in the same time as one cycle through path A. The predetermined amount of data may be a bit, a byte, a word or, for example, 1 bit to 1 Kbytes of data, or any amount of data that the architecture can handle in the time allotted for the function. The CPU processes the gaming machine program and performs the authentication functionalities in a time sharing manner. The percentage of sharing depends on how the sharing affects the gaming machine program's main application that interacts with a user while completing the authentication within a predetermined amount of time.

At step 102 the data that is read is used to calculate a hash message digest representative of the data. At step 103, the CPU determines whether all the data in the high capacity memory 48 has been read in order to determine if the hash calculation is complete. If all the data from the high capacity memory 48 has not been read then the algorithm returns to step 102 to read more data and continue calculating the hash message digest. If at step 103 the hash calculation for all the data has been completed then, at step 104, the calculated hash message digest is compared with a previously stored hash message digest result for the data contents of the high capacity storage memory. The stored hash result may have been stored in one of the various non-volatile memories in the gaming machine. For example, the stored hash result may have been stored in a battery backed NVRAM 38 during boot-up. If the verification comparison indicates that the calculated hash message digest and the stored hash message digest are the same, then the high capacity memory is considered authenticated and the algorithm returns to step 102 and begins reading data from the high capacity storage memory 48 from the beginning (or any predetermined data location) again. This loop continues for as long as the gaming machine is powered on. If the verification comparison fails, at step 104, due to the stored hash not being equal to the calculated hash, then a critical error is displayed, at step 105, on the gaming machine. The gaming machine then becomes non-functional or out-of-order until an attendant comes over the machine and determines what needs to be done to correct the error.

Ideally, the high capacity storage memory has the predetermined amount of data read from it about every 15 ms, but the data reading loop of path A may be substantially any amount of time, for example, from between 2 ms to once a day so long as the read takes place within the limitations of CPU. It is understood that in an exemplary embodiment of the present invention, the high capacity storage memory 48 is not the device from which code is executed. For example, the high capacity memory 48 may be a compact flash card, a hard drive or other type of non-volatile memory device that cannot be used to execute the gaming program. In many circumstances, the high capacity memory 48 may be hot-plugable or hot-swappable with the gaming machine. As such, the runtime validation of the high capacity memory 48 also functions in various ways, as a check or means for making sure the high capacity memory has not been removed, unplugged or partially disconnected from the gaming machine after boot-up.

Furthermore, the high capacity memory 48 may be a non-volatile memory capable of providing an executable program to the microprocessor 32. If this is so, an exemplary embodiment of the invention may not be required to have both a main memory 36 and a high capacity memory 48.

It should be noted again with respect to path A, that there might be more than one high capacity memory that must be authenticated. Path C (dotted line) represents an algorithm wherein one or more additional high capacity memories (or other media devices) are part of the CPU 30 in an exemplary gaming machine. The data in the additional memories may be authenticated via similar means and in parallel with paths A and B.

With respect to path B coming out of step 100, at step 106 data is read from the serial read-write memory 50 and a hash message digest is calculated from all the bits. In the exemplary embodiment the serial read-write memory 50 contains significantly less data than the high capacity memory 48. Since there is significantly less data in the serial read-write memory 50 than the high capacity memory 48, the data in the entire memory can be read as a binary image such that a hash calculation can be performed. The hash calculation result is then compared with a stored serial read-write memory hash message digest that was calculated at boot-up. If the two hash message digests do not match, then the algorithm indicates that the authentication failed and a critical error is displayed on the gaming machine at step 5. On the other hand, if the stored and calculated hash message digests match, then the serial read-write memory contents are considered validated and authentic.

At step 107, the boot memory's data is read and a hash message digest is calculated. The calculated boot memory hash is compared with a boot memory hash message digest that was stored at boot-up. If the hash message digests do not match, the fail path is taken to step 105 and a critical error is displayed on the gaming machine. If the hash message digests match then the boot memory data is validated. Another step could be placed here to validate any other memory associated with the CPU 30. These additional steps may be substantially the same as steps 106 and 107. Once steps 106 and 107 (and any other similar steps) are completed the algorithm goes to step 108. Either path A or B may have one or more authentication processes performed in a serial fashion.

In an exemplary embodiment of the present invention the main memory 36, or other memories (such as the battery backed memory 28 or possibly the high capacity memory 48) may contain both executable code along with graphics data. Executable code and graphics data may be compiled code or uncompiled code. When the gaming machine program (the game executable, operating system executable, and all graphics data) is compiled as a single compiled gaming machine program and stored in the main memory 36 (or other memories) the single compiled gaming machine program can be quite large and take a significant amount of time to authenticate when compared to the time required to authenticate, for example, the boot memory 46. Table 1 illustrates approximate authentication times of compiled or executable programs or files an embodiment of the present invention.

TABLE 1

| Executable Program Size | Average Verification Time |
|---|---|
| 1.5 MB | 1.9 minutes |
| 3.0 MB | 3.8 minutes |
| 4.5 MB | 5.7 minutes |
| 6.0 MB | 7.6 minutes |
| 7.5 MB | 9.5 minutes |
| 9.0 MB | 11.4 minutes |

If a first gaming machine has a gaming machine program in its main memory that is about 1.5 MB, then the authentication time is within a reasonable time frame of less than about 10 minutes. If a second gaming machine has a gaming machine program in its main memory that is greater than about 6.0 MB, then the time required to authenticate begins to become unacceptable due to gaming agencies requesting that the gaming software be authenticated about every 10 minutes while the gaming machine is powered on.

Assume that the main difference between the first and the second gaming machine is that there is more graphics data in the second gaming machine's gaming machine program. Then, it is understandable that if the compiled executable code in both gaming machines are about the same size (give or take a few megabytes), then a separation of executable code portions of the gaming machine program from the graphics data portions would decrease the time required to authenticate the second machine's compiled gaming machine program to about the same amount of time as the first machine's compiled gaming machine program. Furthermore, tampering with the executable data may be more harmful to a user of the gaming machine than tampering with the graphics data. This is because adjusting or tampering with the executable part of the program may affect the proper odds and payouts of the gaming machine. Wherein tampering with the graphics data may have the lesser effect of disturbing the gaming graphics or other multimedia experience. As such, in one embodiment of the present invention the graphics data is separated and left out of the authentication cycle. This may be acceptable because all the graphics data is called by the executable code, which is constantly authenticated. In another embodiment of the present invention, the graphics data is authenticated on a less frequent basis in order to offload the processor so that more time can be dedicated to authenticating the executable code files. For example, the graphics data in the main memory may only be authenticated from every other time the executable code is authenticated to once every hour, day, at predetermined intervals, or after a predetermined number of events. A timer or counter may be utilized to measure a predetermined number of events such as clock counts, cycles, up-counts, down counts, seconds, number of games played, number of users, etc.

Still looking at step 108 of FIG. 3, an exemplary authentication algorithm begins to read data from the main memory (SDRAM) 36 and determined if the data being read is executable code or some another type of code such as graphics data. The determination of whether data is graphics data or executable code can be made prior to reading the data. Reading data and the determining whether the data is graphics data or executable code can take more time than already having loaded static memory addresses of indicating whether data in such static memory addresses is graphics data or executable code. As such, in embodiments of the present invention, static memory addresses are loaded into one of the volatile or non-volatile memories indicating where all the data is, for example, in the main memory 36 or the high capacity memory 28 and what type of data it is. In other exemplary embodiments of the present invention wherein data is dynamically loaded into a memory device, various exemplary methods can be utilized to identify the data locations and the data type. For example, a list indicating which memory locations are storing graphics data and which memory locations are storing executable code can be created and stored at the time the data is loaded into a memory device at boot-up during programming of the device, or any other time. Such a list allows the CPU to forego reading the data before making a type-of-data determination.

If the data read is executable code (e.g., belongs to an executable file), then at step 110 a hash calculation is performed on the content of that executable file. The hash message digest is compared against the hash message digest that was stored in a non-volatile RAM at, for example, boot-up for the particular executable file. If the hash message digests do not match, then authentication fails and a critical error is displayed at step 105. If the signatures match and are verified, then the executable file is authenticated. At step 112 it is determined whether all the executable files in the main memory have been read. If all the files have not been read then the algorithm goes back to step 108 to read the next file or predetermined amount of data.

If the next file or predetermined amount of data that is read at step 108 is not executable code, then at step 109 a timer or counter is checked. If this is the first time through the algorithm loop, then the algorithm will automatically go from step 109 to step 111 wherein non-executable data or files (e.g., graphics data or files) are authenticated. If this is not the first time through the algorithm loop, then the timer, counter or countdown (hereinafter "timer") is checked to determine whether a predetermined amount of time (counts or number of events) have passed. If the predetermined amount of time had not passed, then the non-executable file is not authenticated at step 111 and the algorithm returns to step 108 to read the next file. If the timer has reached the predetermined amount of time (counts), then the graphics file is checked for authenticity via, for example, by comparing a calculated hash message digest with a previously stored hash message digest as discussed previously. If the non-executable file cannot be authenticated by the calculate-and-compare hashes method, then a critical error is displayed at step 105. If the non-executable file is authenticated by calculating a hash message digest and then comparing the calculated message digest with a stored message digest for the file, then the algorithm checks whether the last file in the main memory has been read at step 112. If the last file has not been read, then the algorithm returns to step 108 and reads the next file or predetermined amount of data. If the last file has been read from the main memory 36 at step 112, then the battery backed memory 38 is checked at step 113.

With respect to step 109, another exemplary embodiment may have a timer for each of the graphics data files so that the more critical graphics data files can be set to be checked more often than, for example, a non-critical graphics data file. Another exemplary reason for giving each graphics data file its own timer would be to stagger the authentication of the non-executable files in order to limit loading on the microprocessor 32.

The battery backed memory 38 is checked at step 113. In an exemplary embodiment a cyclic redundancy check (CRC) is performed on the nonvolatile RAM, battery backed memory 38. A CRC is a technique for detecting data changes or errors. A checksum or perhaps a hash calculation could also be used to authenticate the battery backed memory 38.

If the battery backed memory 38 is not determined to be authentic, then a critical error is displayed at step 105. If the battery backed memory 38 is authenticated, then the exemplary algorithm checks to make sure the machine is running at step 114. If the machine continues to be operational then the loop returns to step 106 wherein the authentication of data within the selected memory devices is repeated in a serial manner and substantially in parallel with the authentication of the high capacity memory 48.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of authenticating memory devices' data within a gaming machine while said gaming machine is operating, said memory devices' data being authenticated substantially in parallel, said method of authenticating comprising:
   reading a next predetermined amount of data from a first memory device storing executable code for operating a wagering game on said gaming machine and graphic data accessed by said executable code to display graphics of said wagering game on a display of said gaming machine;
   determining if the next predetermined amount of data is executable code or graphic data;
   if said next predetermined amount of data is graphic data, then reading a next predetermined amount of data, without authenticating the graphic data;
   if said next predetermined amount of data is executable code, then authenticating said executable code; and
   wherein the above steps are repeated substantially continuously while said gaming machine is operating.

2. The method of claim 1, wherein the method of claim 1 is repeated until said executable code cannot be authenticated.

3. The method of claim 1, wherein said next predetermined amount of data is a file.

4. The method of claim 1, wherein said first memory device is a volatile memory device containing a gaming machine program.

5. The method of claim 1, wherein if said next predetermined amount of data is said graphic data then determining whether a predetermined amount of events have passed, and wherein if said predetermined amount of events have passed then overriding reading the next predetermined amount of data without authenticating the graphic data and authenticating said graphic data.

6. The method of claim 1, further comprising:
   reading a next second-predetermined amount of data from a second memory device; and determining whether said next-second predetermined amount of data is authentic;
   repeating said reading said next second-predetermined amount of data from the second memory device step and said determining whether said next second-predetermined amount of data step continuously while said gaming machine is operating, wherein said reading said next predetermined amount of data step and said reading said next second-predetermined amount of data step are is performed substantially in parallel.

7. The method of claim 1, further comprising
   reading a next second-predetermined amount of data from a second memory device;
   calculating a hash message digest with said next second-predetermined amount of data; and determining whether all data from said second memory device has been read;
   if all data from said second memory device has not been reads then repeating said reading a next second-predetermined step, calculating step and determining whether steps again;
   if all data from said second memory device has been read, then using said calculated hash message digest to authenticate the data in said second memory;
   wherein said reading said next predetermined amount of data and said reading said next second-predetermined amount of data is performed substantially in parallel.

8. The method of claim 1, wherein authentication of said memory devices' data is performed repetitiously within a predetermined amount of time.

9. The method of claim 8 wherein said predetermined amount of time is an amount of time that is less than 24 hours.

10. A method of authenticating data within at least one memory of a gaming machine while the gaming machine is executing a wagering game, said at least one memory storing executable code for operating said wagering game and graphics data accessed by said executable code to display graphics of said wagering game on a display of said gaming machine, said method comprising:
   (a) determining if a next predetermined amount of data from said memory is executable code or graphics data;
   (b) if said next predetermined amount of data is executable code, then authenticating said executable code and returning to step (a); and
   (c) if said next predetermined amount of data is graphics data and a predetermined condition has been met, then authenticating said graphics data and returning to step (a); and if said next predetermined amount of data is graphics data and said predetermined condition has not been met, then returning to step (a) without authenticating said graphics data.

11. The method of claim 10, wherein said predetermined condition occurs at predetermined intervals, after a predetermined number of events, or after a predetermined number of times for authenticating said executable code.

12. The method of claim 10, wherein said next predetermined amount of data is a file.

13. The method of claim 12, wherein data file has an associated verification code.

14. The method of claim 13, wherein the associated verification code is a digital signature.

15. The method of claim 10, wherein said at least one memory device is a volatile memory device.

16. The method of claim 10, further including reading said next predetermined amount of data prior to said determining step.

17. The method of claim 16, wherein the authenticating of said executable code includes performing a hash calculation on said read data, said hash calculation providing a result that is used in authenticating said executable code.

18. A method of authenticating data within at least one memory of a gaming machine, said at least one memory storing executable code for operating a wagering game on said gaming machine and graphics data accessed by said executable code to display graphics of said wagering game on a display of said gaming machine, said method comprising:
   (a) while said gaming machine is booting up, authenticating both the executable code and the graphics data; and
   (b) while said gaming machine is executing said a wagering game after booting up:
      (i) determining if a next predetermined amount of data from said memory is executable code or graphics data;
      (ii) if said next predetermined amount of data is executable code, then authenticating said executable code and returning to step (i); and
      (iii) if said next predetermined amount of data is graphics data and a predetermined condition has been met, then authenticating said graphics data and returning to step (i); and if said next predetermined amount of data is graphics data and said predetermined condition has not been met, then returning to step (i) without authenticating said graphics data.

19. The method of claim 18, wherein said predetermined condition occurs at predetermined intervals, after a predetermined number of events, or after a predetermined number of times for authenticating said executable code.

20. The method of claim 18, wherein said at least one memory device is a volatile memory device.

21. The method of claim 18, further including reading said next predetermined amount of data prior to said determining step.

22. The method of claim 21, wherein the authenticating of said executable code includes performing a hash calculation on said read data, said hash calculation providing a result that is used in the authenticating of said executable code.

23. The method of claim 22, wherein the next predetermined amount of data is a file having an associated verification code.

24. The method of claim 23, wherein the associated verification code is a digital signature.

25. A method of authenticating data within at least one memory of a gaming machine, said at least one memory storing executable code for operating a wagering game on said gaming machine and graphics data accessed by said executable code to display graphics of said wagering game on a display of said gaming machine, said method comprising:
   (a) while said gaming machine is booting up, authenticating both the executable code and the graphics data; and
   (b) while said gaming machine is executing said a wagering game after booting up, authenticating said executable code at a first frequency and authenticating said graphics data at a second frequency, said first frequency being greater than said second frequency.

26. The method of claim 25, wherein said second frequency is based on a predetermined condition, said predetermined condition occurring at predetermined intervals, after a predetermined number of events, or after a predetermined number of times for authenticating said executable code.

27. The method of claim 25, wherein the data file has an associated verification code.

28. The method of claim 27, wherein the associated verification code is a digital signature.

* * * * *